United States Patent [19]

Nakajima

[11] Patent Number: 5,677,772
[45] Date of Patent: Oct. 14, 1997

[54] IMAGE PROCESSING APPARATUS AND OPERATION GUIDANCE METHOD

[75] Inventor: Toshifumi Nakajima, Tokyo, Japan

[73] Assignee: Canon Kabushiki Kaisha, Tokyo, Japan

[21] Appl. No.: 365,106

[22] Filed: Dec. 28, 1994

[30] Foreign Application Priority Data

Dec. 28, 1993 [JP] Japan .................. 5-336193

[51] Int. Cl.⁶ .................. H04N 1/00; G09D 19/00
[52] U.S. Cl. .................. 358/400; 358/468; 386/52; 434/428
[58] Field of Search .................. 358/400, 406, 358/468, 335, 342, 452; 395/114, 154, 155, 161; 434/428; 386/52, 56

[56] References Cited

U.S. PATENT DOCUMENTS

| | | | |
|---|---|---|---|
| 4,395,236 | 7/1983 | Gotthold | 358/335 |
| 4,922,335 | 5/1990 | Outa et al. | 358/506 |
| 5,103,318 | 4/1992 | Takaoka | 358/404 |
| 5,189,521 | 2/1993 | Ohtsubo et al. | 358/296 |
| 5,488,488 | 1/1996 | Shimizu | 358/468 |

*Primary Examiner*—Scott A. Rogers
*Attorney, Agent, or Firm*—Fitzpatrick, Cella, Harper & Scinto

[57] ABSTRACT

An image processing apparatus whereby a user is able to perform an appropriate operation easily and without mistakes on the basis of guidance images related to the operation of the apparatus. Images related to operation guidance of the apparatus are input by a CCD line sensor and a reading motor beforehand and stored in a RAM. The user manipulates keys so that a guidance image necessary for an operation from among images related to operation guidance of the apparatus stored in the RAM is displayed on a display device.

16 Claims, 14 Drawing Sheets

IMAGE PROCESSING APPARATUS AND OPERATION GUIDANCE METHOD

BACKGROUND OF THE INVENTION

1. Field of the Invention

The present invention relates to an image processing apparatus having a function to display operation procedures of the apparatus, suitable for printers, copier machines, facsimile machines, television telephone sets, or television conference systems, and a method of guiding the operation of the apparatus.

2. Description of the Related Art

The operation section of conventional image processing apparatuses, for example, facsimile machines, is composed of a display section for displaying the operating state of the facsimile and the operation guidance in characters, and general-purpose keys for operations. However, in the above-described conventional image processing apparatus, wording of the guidance for an operation method cannot always be stated in a manner which is easy to understand, and therefore, the user is often confused regarding the operation. Also, since the guidance of the operation method is made by characters or still images which are prepared beforehand, power of expression is insufficient, and in some cases the user cannot understand the meaning of the guidance, which is problematical. In addition, since the guidance image is fixed, this image cannot be changed even if the guidance is difficult to understand.

SUMMARY OF THE INVENTION

In view of the above-described problems of the prior art, it is an object of the present invention to provide an image processing apparatus capable of displaying easy-to-understand operation guidance and a method of guiding the operation of the apparatus.

It is another object of the present invention to provide an image processing apparatus capable of displaying operation guidance using moving pictures and a method of guiding the operation of the apparatus.

It is a further object of the present invention to provide an image processing apparatus capable of changing operation guidance and a method of guiding the operation of the apparatus.

It is a still further object of the present invention to provide an image processing apparatus and a method of guiding the operation of the apparatus having novel functions.

To achieve the above-described objects, according to one aspect of the present invention, there is provided an image processing apparatus, comprising: input means for inputting image information related to the operation guidance of said image processing apparatus, which image information is correlated with each other and is composed of a plurality of frames; and display means for displaying image information inputted by the input means.

The above and further objects, aspects and novel features of the invention will more fully be appreciated from the following detailed description when read in connection with the accompanying drawings. It is to be expressly understood, however, that the drawings are for the purpose of illustration only and are not intended to limit the invention.

DESCRIPTION OF THE PREFERRED EMBODIMENTS

[First Embodiment]

A first embodiment of the present invention will be explained below with reference to the accompanying drawings.

Figure 1:
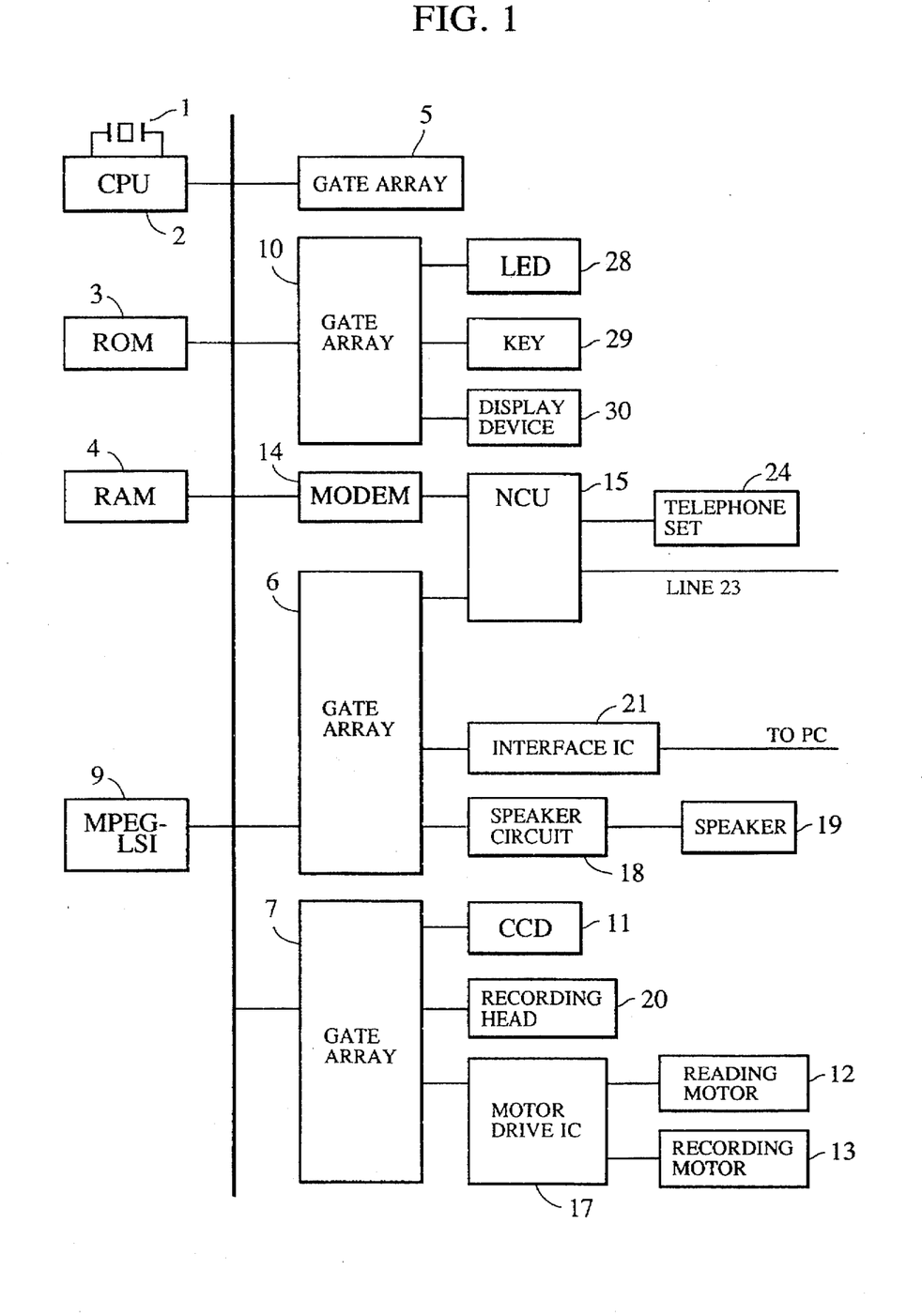
FIG. 1 is a block diagram of a facsimile in accordance with a first embodiment of the present invention.

FIG. 1 is a block diagram illustrating the construction of the essential portion of a facsimile in accordance with a first preferred embodiment of the present invention. Needless to say, this embodiment which will be described below can be applied, in addition to a facsimile, to an image processing apparatus, such as printers, copier machines, facsimile machines, television telephone sets, or television conference systems.

Referring to FIG. 1, reference numeral 1 denotes a quartz oscillator; and reference numeral 2 denotes a CPU which controls the entire apparatus in accordance with programs stored in a ROM 3. Moving pictures for guidance, which will be described later, are prestored in the ROM 3 before shipment from the factory. In this embodiment, it is assumed that a moving picture is formed of at least one frame/sec. A RAM 4 stores operation guidance which can be changed from among moving pictures for operation guidance, which will be described later, and is used as a work area for the CPU 2. The RAM 4 is a large-capacity memory having a number of frames in which the moving pictures for guidance are stored. A reading section is formed of a CCD line sensor 11, a reading motor 12, and the like, and is used to read an image. An image recording section is formed of a recording head 20, a recording motor 13, and the like, and is used to record a received image or a copy image. A modem 14 modulates and demodulates image data and control sequence data, and is connected to a line 23 via an NCU 15 which maintains the loop current of the line and switches the line with a telephone set (not shown). Reference numerals 5 to 7 each denote a gate array, and reference numeral 9 denotes a known MPEG-LSI used for facsimile transmission and reception and for compressing a moving picture for guidance which will be described later. Reference numeral 17 denotes a motor drive IC; reference numeral 18 denotes a speaker circuit; reference numeral 19 denotes a speaker; reference numeral 21 denotes an interface IC for connecting to a computer.

Figure 2:
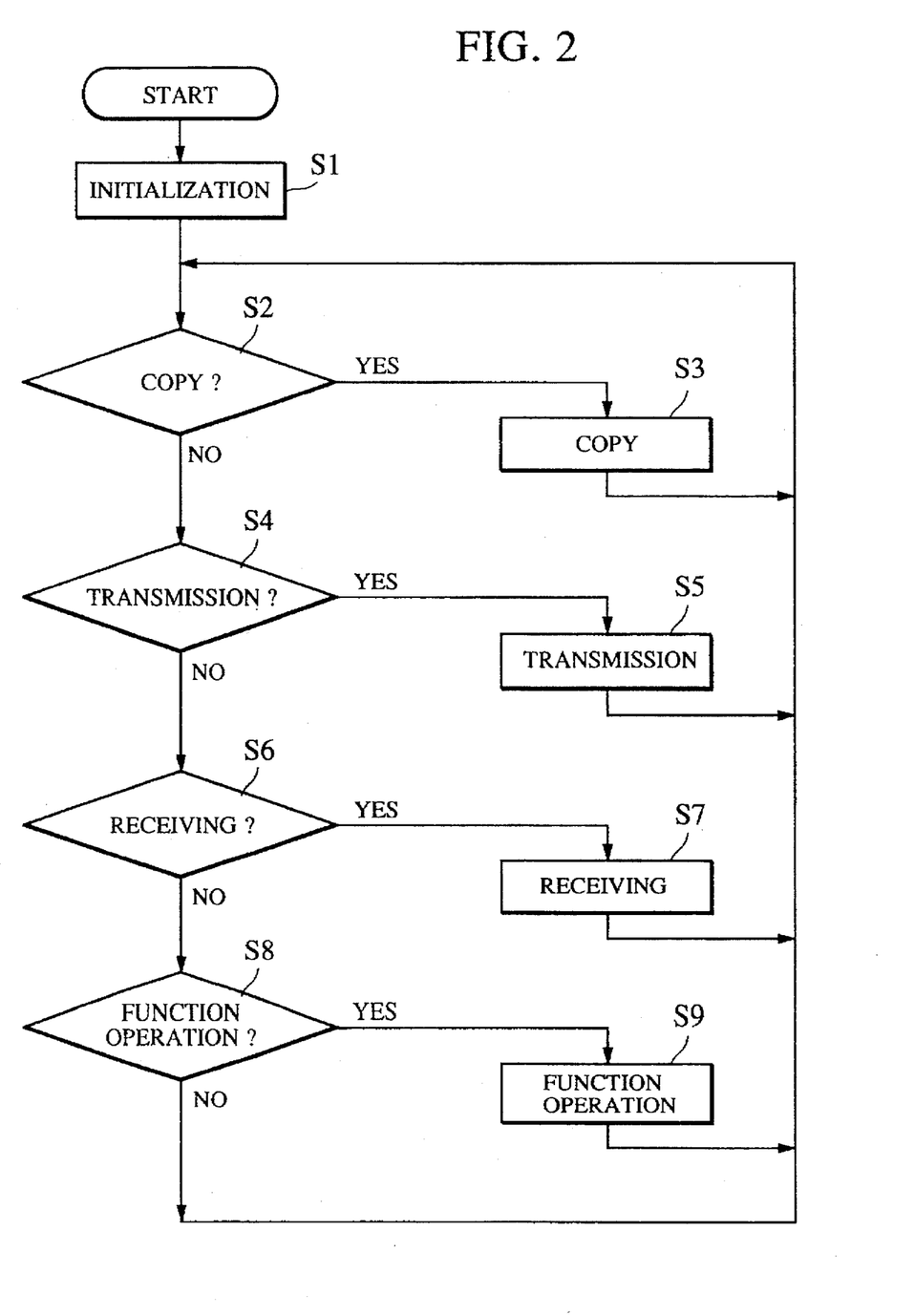
FIG. 2 is a flowchart illustrating a case in which an instruction from a user is waited while the power supply of the facsimile is turned on in accordance with the first embodiment of the present invention.
Figure 11:
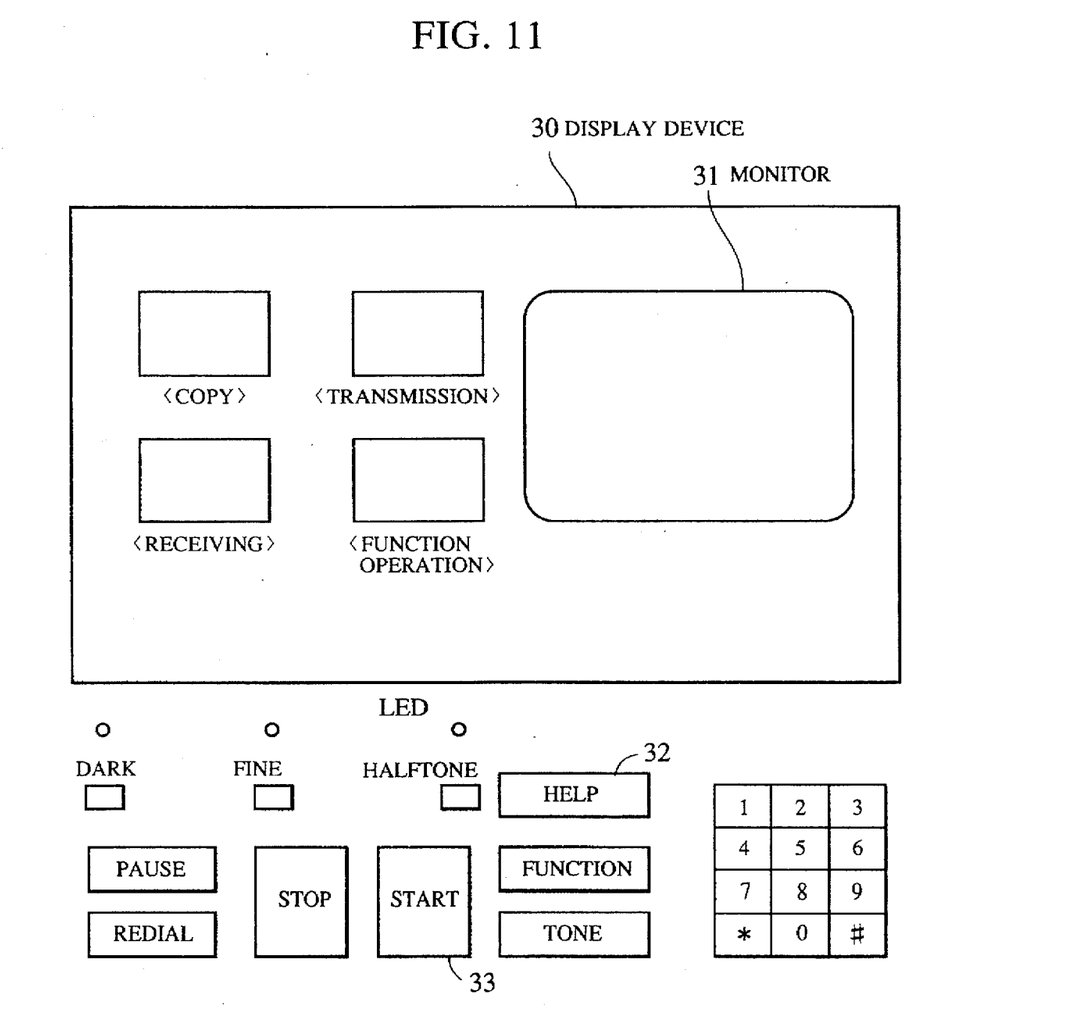
FIG. 11 is an exterior view of an operation panel in accordance with the first embodiment of the present invention.

The basic functions of the operation of the facsimile of this embodiment will be explained with reference to FIGS. 2 and 11. An explanation of functions in FIG. 11 which are not related to this embodiment is omitted.

When the power supply of the facsimile is turned on, the parameter are initialized in step S1, and then while passing through the loop: S2–S4–S6–S8, the apparatus is placed in a standby state in which the apparatus waits for an instruction from the user via the operation panel of the facsimile of this embodiment shown in FIG. 11. When the user presses a key to operate a function in a display device 30 shown in FIG. 11, the process proceeds to step S9. The display device 30 is a touch panel which detects the position pressed by the user via a digitizer sheet (not shown) on the back of the display device 30 and detects the mode indicated by the user on the basis of the coordinates.

Figure 3:
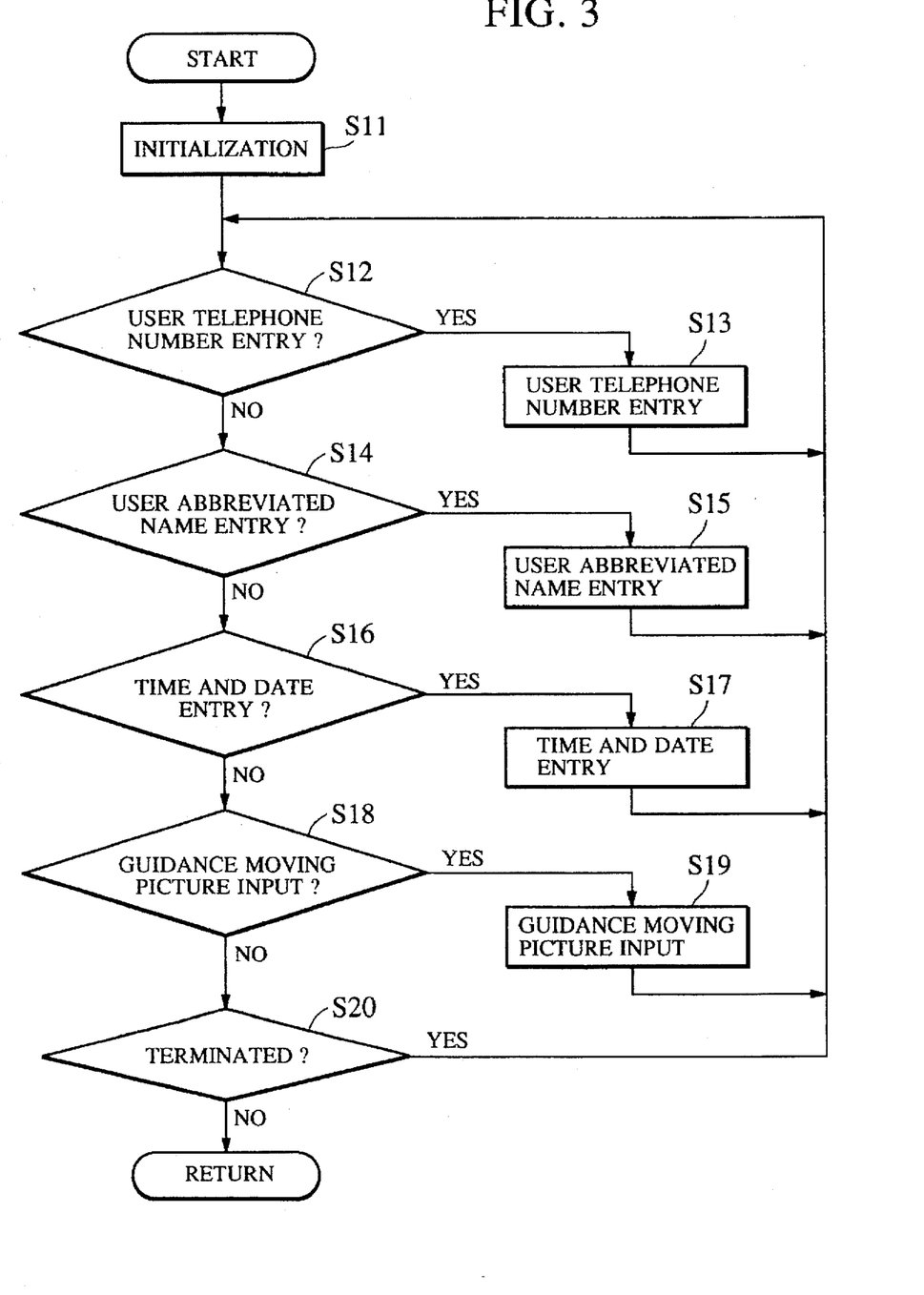
FIG. 3 is a flowchart illustrating the operation for entry and change of entry at set time.

FIG. 3 shows a detailed flow of step S9, and is a flowchart illustrating the operation for user entry and change of entry during initialization.

Figure 12:
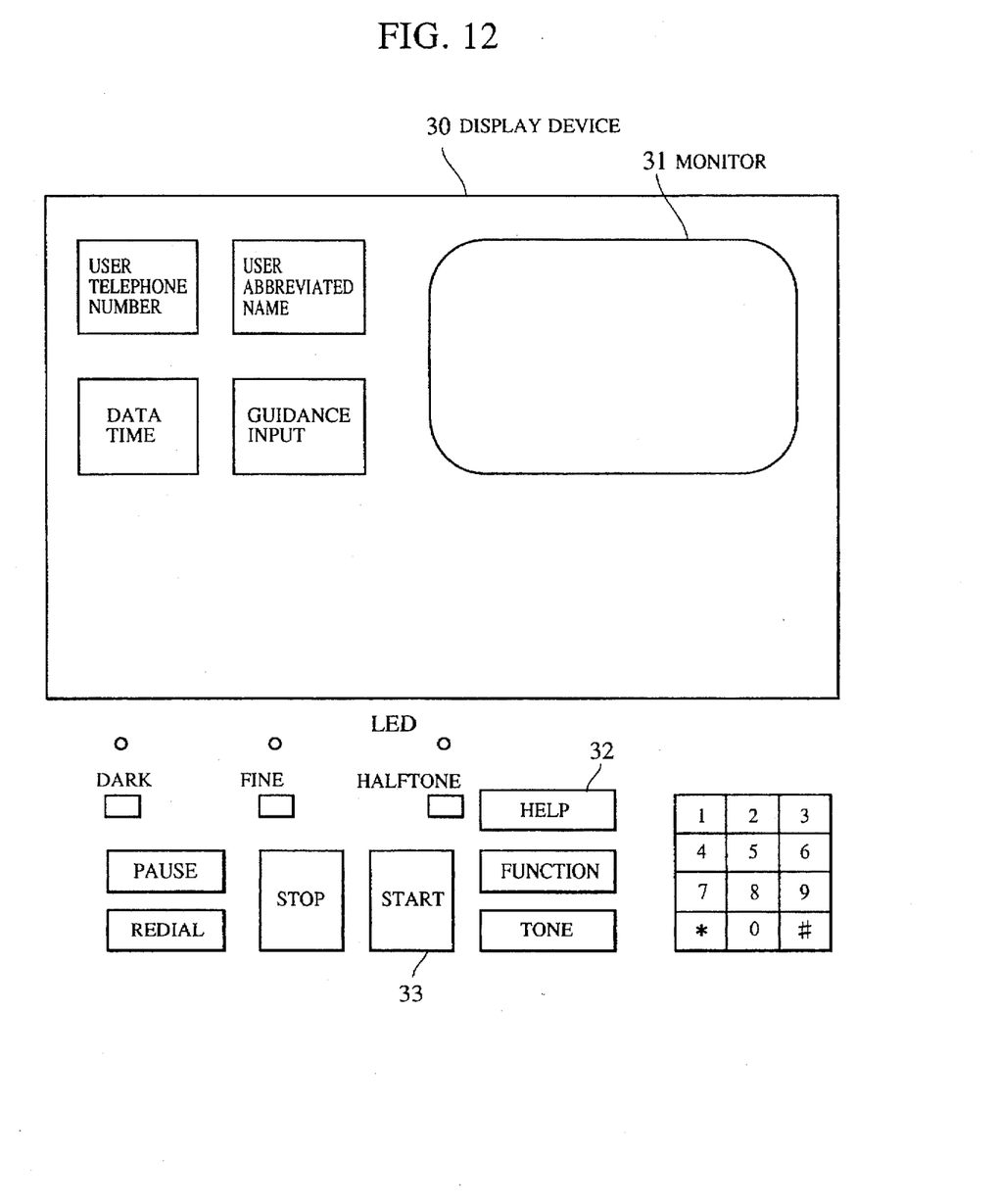
FIG. 12 is an exterior view of an operation panel in accordance with the first embodiment of the present invention.

When a key for performing a function operation is pressed, the display device 30 changes to the display shown in FIG. 12. Upon the initiation of the function operation, the parameters are initialized in step S11, and the process proceeds to step S12 where the apparatus waits for an operation.

In the state in which the apparatus waits for an operation, the user is able to select which one of the operations in the loop of S12, S14, S16, S18, S20 and S12 should be performed. The CPU 1, as described above, determines any of <User Tel>, <User Abbreviated Name>, <Data and Time> and <Guidance> displayed on the display device 30 has been pressed in order to determine the mode selected by the user. The selected function operation is entered, and after the operation is terminated, the apparatus enters a state of waiting for an operation.

If, for example, inputting of "Guidance" is pressed and determined by the user on the display device 30 in step S18, an operation for inputting "Guidance" is performed in step S19, after which the apparatus enters a state of waiting for an operation.

Figure 4:
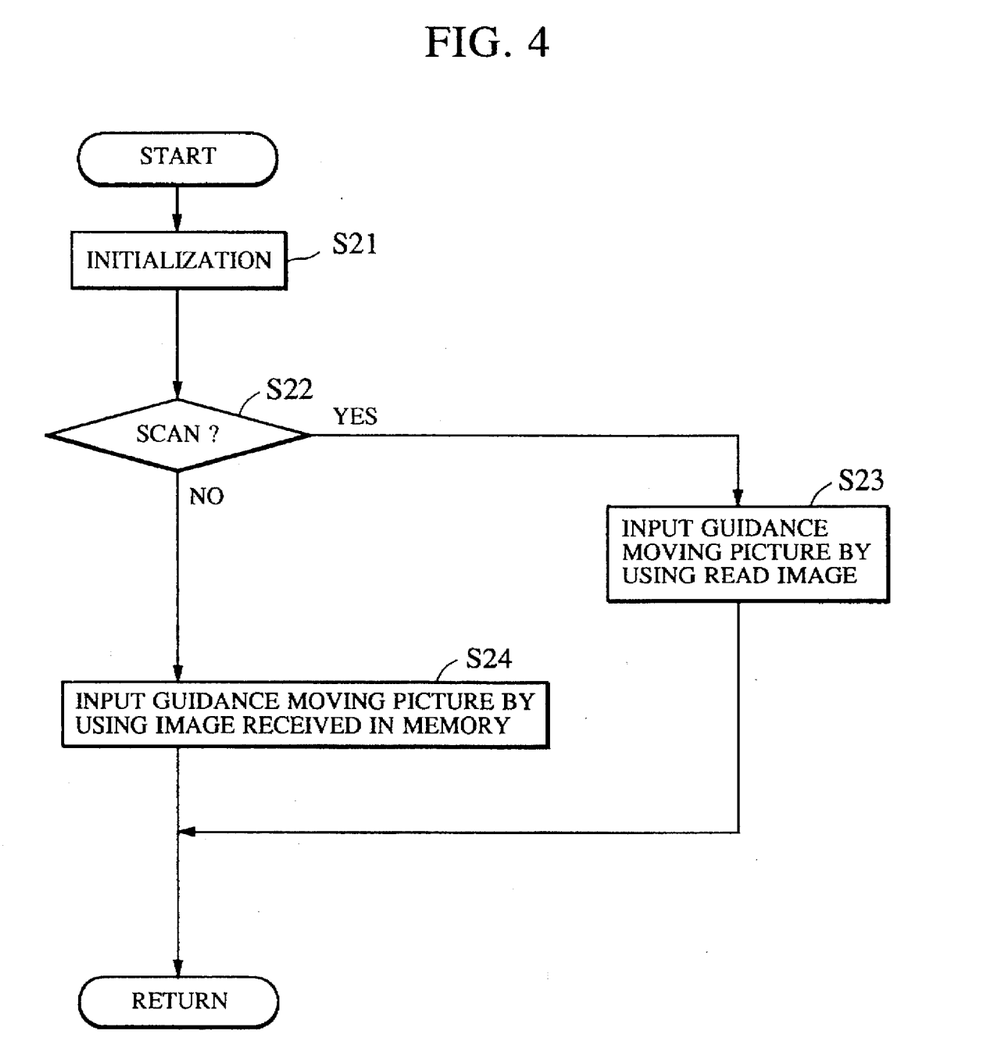
FIG. 4 is a flowchart illustrating steps for creating icons.

FIG. 4 is a flowchart of a step for inputting a moving picture for guidance in step S19.

Figure 13:
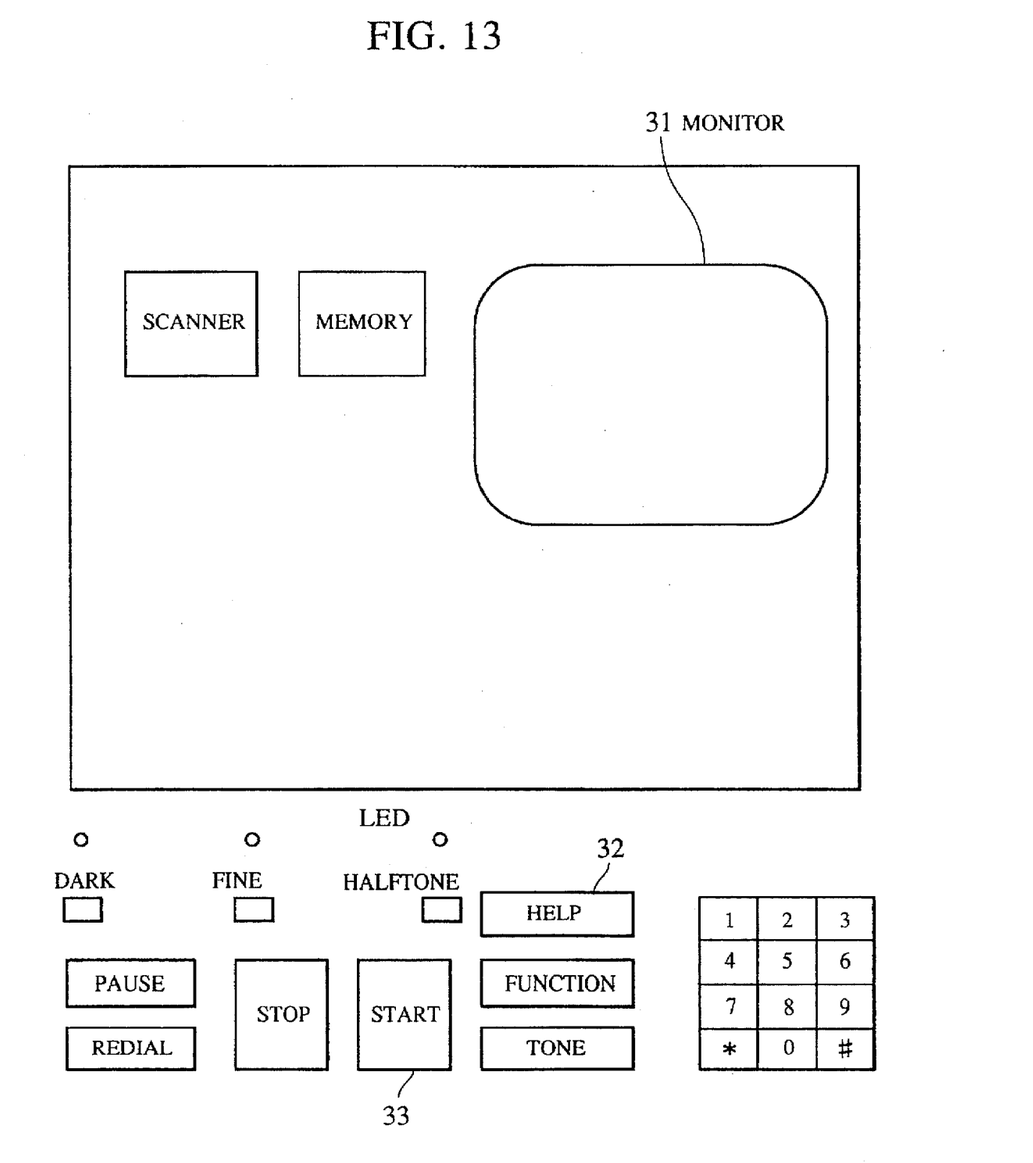
FIG. 13 is an exterior view of an operation panel in accordance with the first embodiment of the present invention.

The display device 30 changes to the display shown in FIG. 13 in accordance with the instruction of guidance entry of S18. The parameters are initialized in step S21, and when inputting by a scanner is indicated on the display device of FIG. 13 in step S22, the process proceeds to step S23 where the user selects a necessary guidance from among guidances attached in the operation manual beforehand for moving-picture guidance, and a plurality of selected images for the guidance are input from the reading section of FIG. 1.

When, on the other hand, inputting of an image received in the memory is indicated in step S23, a moving picture for guidance desired by the user is input from another facsimile terminal by using the input image received in the memory in step S24. Since, as described above, it becomes possible to input a moving picture for guidance by using an image received in the memory, even if a method of operating a facsimile of this embodiment is not known, the operation method can be recognized easily by receiving an image in the memory from the other facsimile terminal and using the image.

Figure 5:
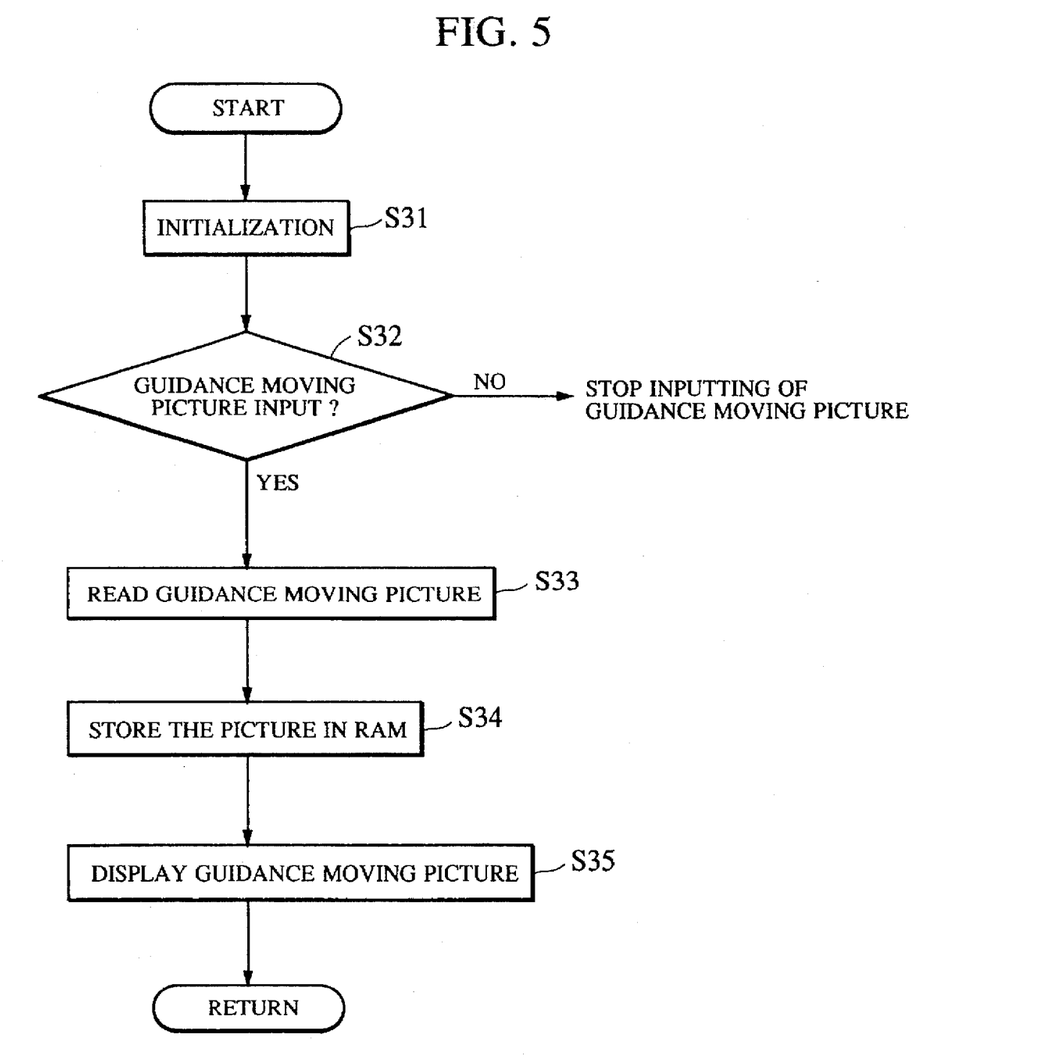
FIG. 5 is a flowchart for changing an icon by using a read image.

FIG. 5 is a flowchart illustrating step S23 in detail, that is, a sequence for inputting a moving picture for guidance to the RAM 4 by scanning input.

The parameters are initialized in step S31 in response to an instruction for scanning input of FIG. 13. In step S32, to input moving pictures for guidance, a plurality of desired moving pictures for guidance, which are selected from the operation manual by the user, are set in the reading section. In step S33, the images are read. In step S34, the read images are interlaced so that the image is formed to a size which can be displayed on a monitor 31, is compressed by using an MPEG-LSI, which will be described later, and stored sequentially in the RAM 4.

After the plurality of moving pictures for guidance have been completely stored in the RAM 4, in step S35, the images are displayed on the monitor 31 in order to determine whether the moving pictures for guidance stored in the RAM 4 have been normally stored. This terminates the operation for inputting the moving pictures for guidance to the RAM 4. If no moving picture for guidance is set in the document reading section for a predetermined period of time calculated by a timer (not shown), it is determined in step S32 that the inputting of the moving picture for guidance is stopped, and the apparatus enters the state of waiting for an operation in FIG. 3.

Figure 6:
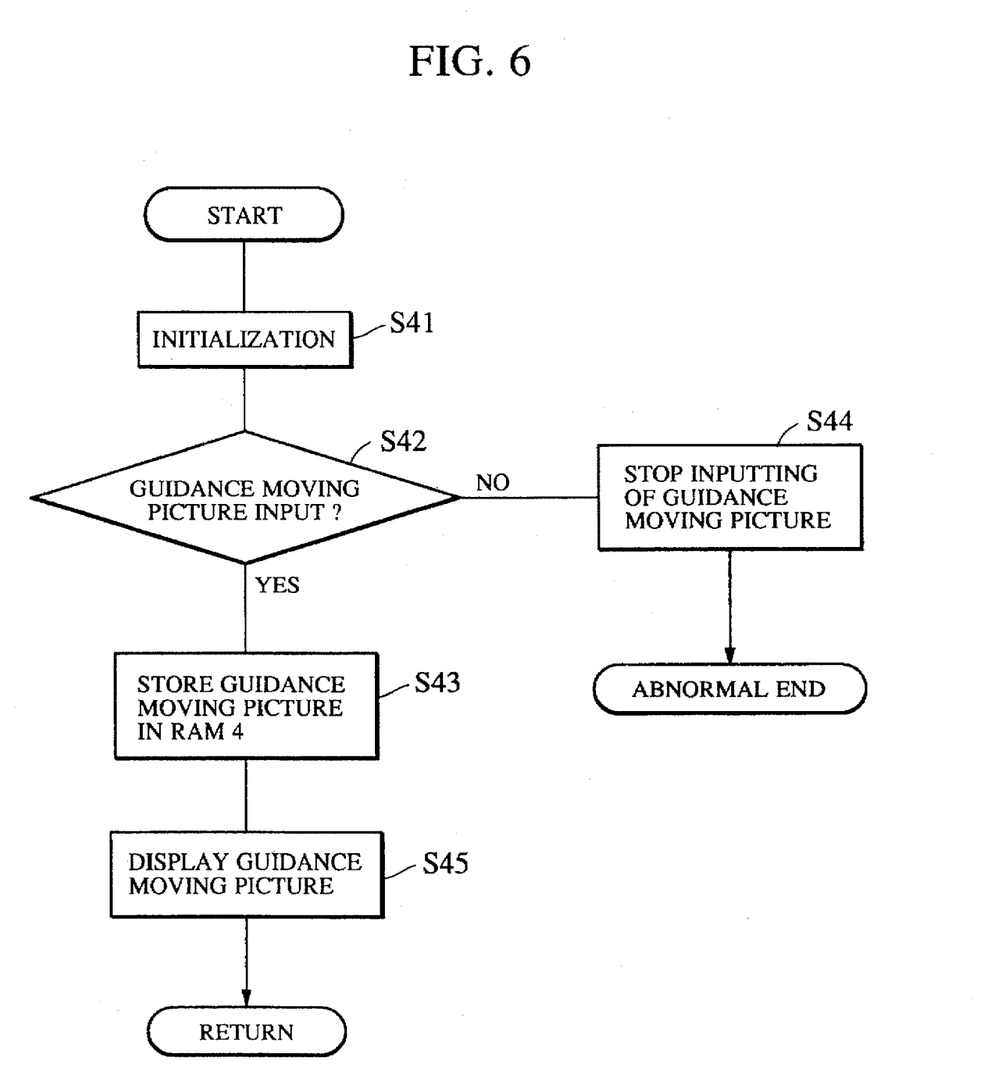
FIG. 6 is a flowchart for changing an icon by using an image received in a memory.

Next, the flow of inputting a moving picture for guidance by using an image received in the memory of step S24 is shown in FIG. 6. In step S41, in response to a touch instruction for memory reception on the display device 30 of FIG. 13, the parameters are initialized. In step S42, a moving picture for guidance is input. It is assumed that the moving picture for guidance which is input (received in the memory) in S42 is an image received from another facsimile having the same construction as that in this embodiment, and the moving picture for guidance has already been input to the other facsimile by scanning or memory reception.

In step S43, the moving picture for guidance is received from the other terminal, and the received image is stored in the RAM 4. In step S45, the moving picture for guidance stored in the RAM 4 is displayed as being a moving picture on the monitor 31. After it is determined whether the moving picture for guidance has been stored normally, the operation of inputting the moving picture for guidance to the RAM 4 is terminated. When it is determined by a timer (not shown) which is under control of the CPU 1 that no image has been received in the memory for a predetermined time after an instruction for receiving a moving picture for guidance in a memory is received, it is determined that the inputting of the moving picture for guidance is stopped, and the facsimile of this embodiment enters a state of waiting for an operation in FIG. 3.

Figure 7:
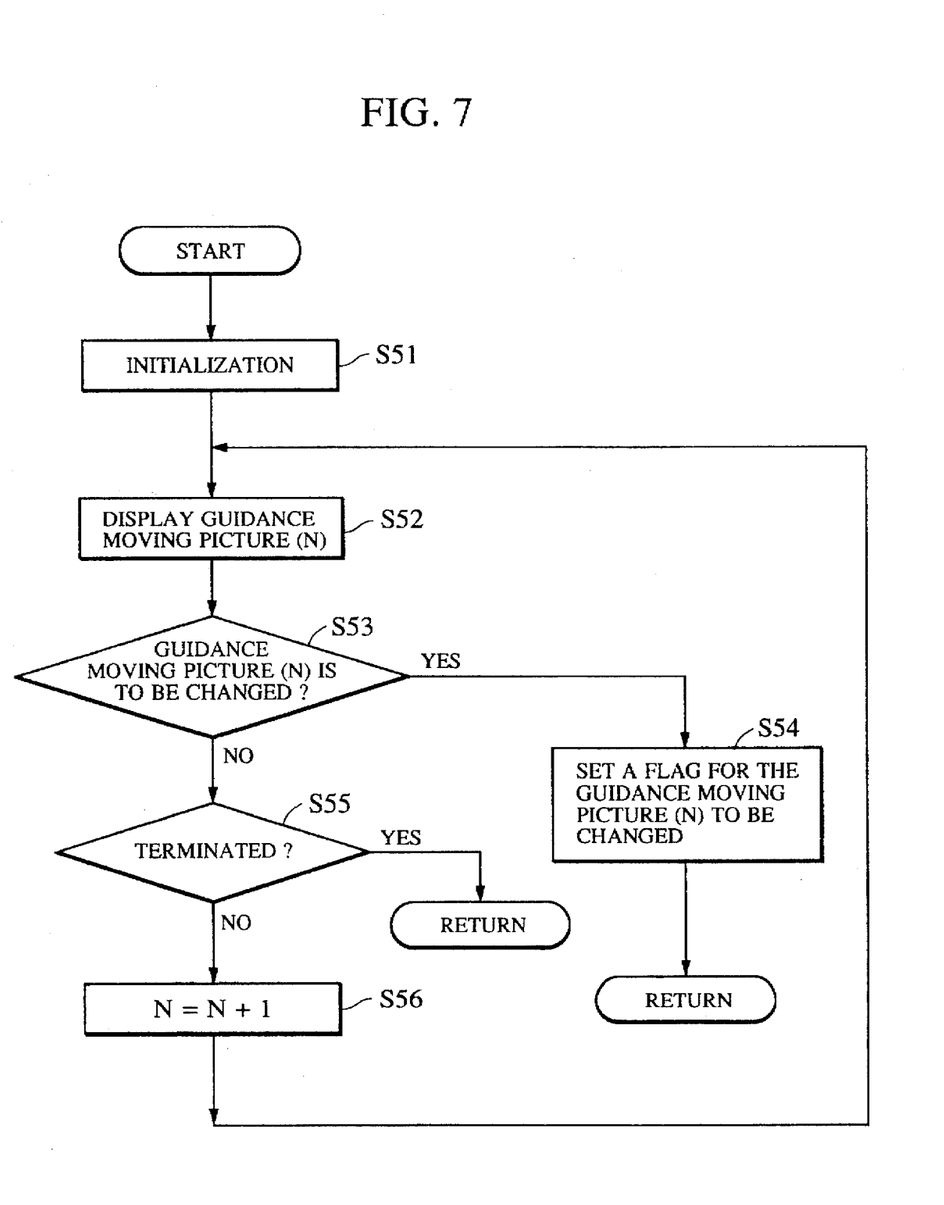
FIG. 7 is a flowchart illustrating an operation for selecting an icon image to be changed in FIGS. 5 and 6.

FIG. 7 shows a detailed flow of an operation for selecting a moving picture for guidance which is to be changed when the free area of the RAM 4 becomes full after the steps S33, S33 and S43.

In step S51, the parameters are initialized, and then it is determined whether the RAM 4 has a free area for storing the moving picture for guidance to be stored in the RAM 4. When there is no free storage area, the fact that it is impossible to read or receive an image is displayed on the monitor 31. For that display, in step S52, to indicate the moving picture for guidance to be changed, the picture is read out from the RAM 4 where the moving picture for guidance is stored, and displayed on the monitor 31 of FIG. 11. In step S53, a check is made to determine if the operation for selecting the moving picture for guidance has been performed by the user, that is, the start key of FIG. 11 for permitting the start of reading or reception of an image in memory has been input. When no selection has been made and the operation for stopping the selection operation has been performed by the user, that is, the stop key has been input in step S55, the inputting of the moving picture for guidance is stopped, and the apparatus enters a state shown in FIG. 3 in which various operations can be selected.

When an instruction for stopping the inputting of the moving picture for guidance has not been issued in step S55, if the moving picture for guidance being currently displayed is assumed to be an N-th one, N is increased by 1 in step S56 in order to display the next moving picture for guidance, that is, (N+1)-th moving picture for guidance. And then, the process returns to step step S52 where a display of the (N+1)-th moving picture for guidance is made in a manner similar to the above explanation, and the user performs a selection operation in the same way as for the N-th moving picture for guidance.

When the changing of the moving picture for guidance is instructed in step S53, a flag is set for the indicated moving picture for guidance, and the flagged moving picture for guidance is rewritten in steps S35 and S45.

Figure 8:
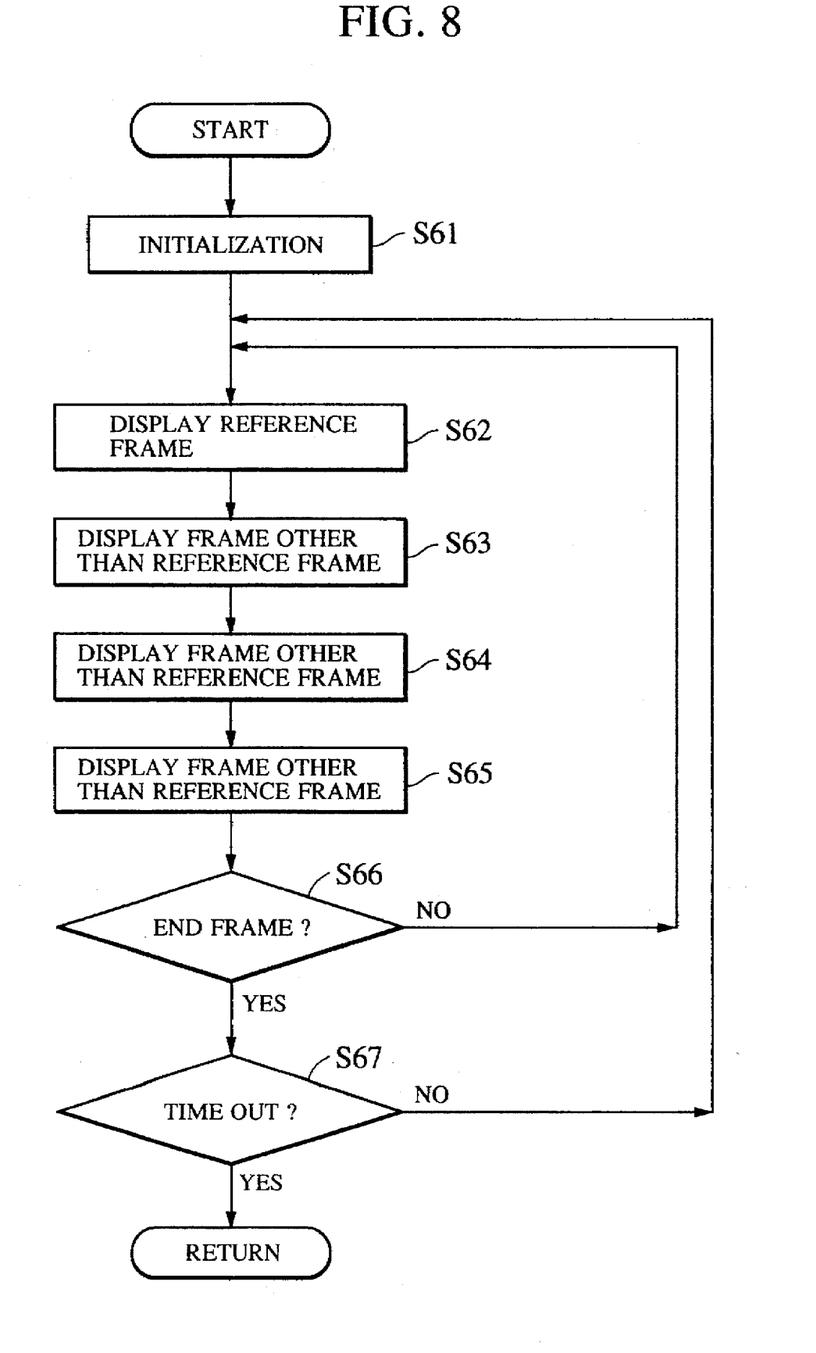
FIG. 8 is a flowchart schematically illustrating the compression in conformity with MPEG (Moving Picture Coding Experts Group) for displaying an icon by using a moving picture.

FIG. 8 is a flowchart for displaying the moving picture for guidance of step S52, which picture is in conformity with MPEG. When the user presses the "help" key of FIG. 11, the first frame of the moving picture for guidance is displayed on the monitor 31. Each time the "help" key is pressed, the guidance is switched to another guidance. By pressing a start key 33 by the user when a desired guidance is displayed on the monitor 31, the guidance is played back.

The parameters are initialized in step S61. A display in predetermined units in conformity with the known MPEG is made in the loop: steps S62, S63, S64, S65, S66 and S62. If it is determined that the end frame has been reached in step S66, a check is made in step S67 to determine if a predetermined display time is over. When the display termination time is reached, the display is terminated assuming that the user has recognized the moving picture for guidance. The process returns to step S62 until the time is over, and the display of the indicated moving picture for guidance is repeated.

Figure 9:
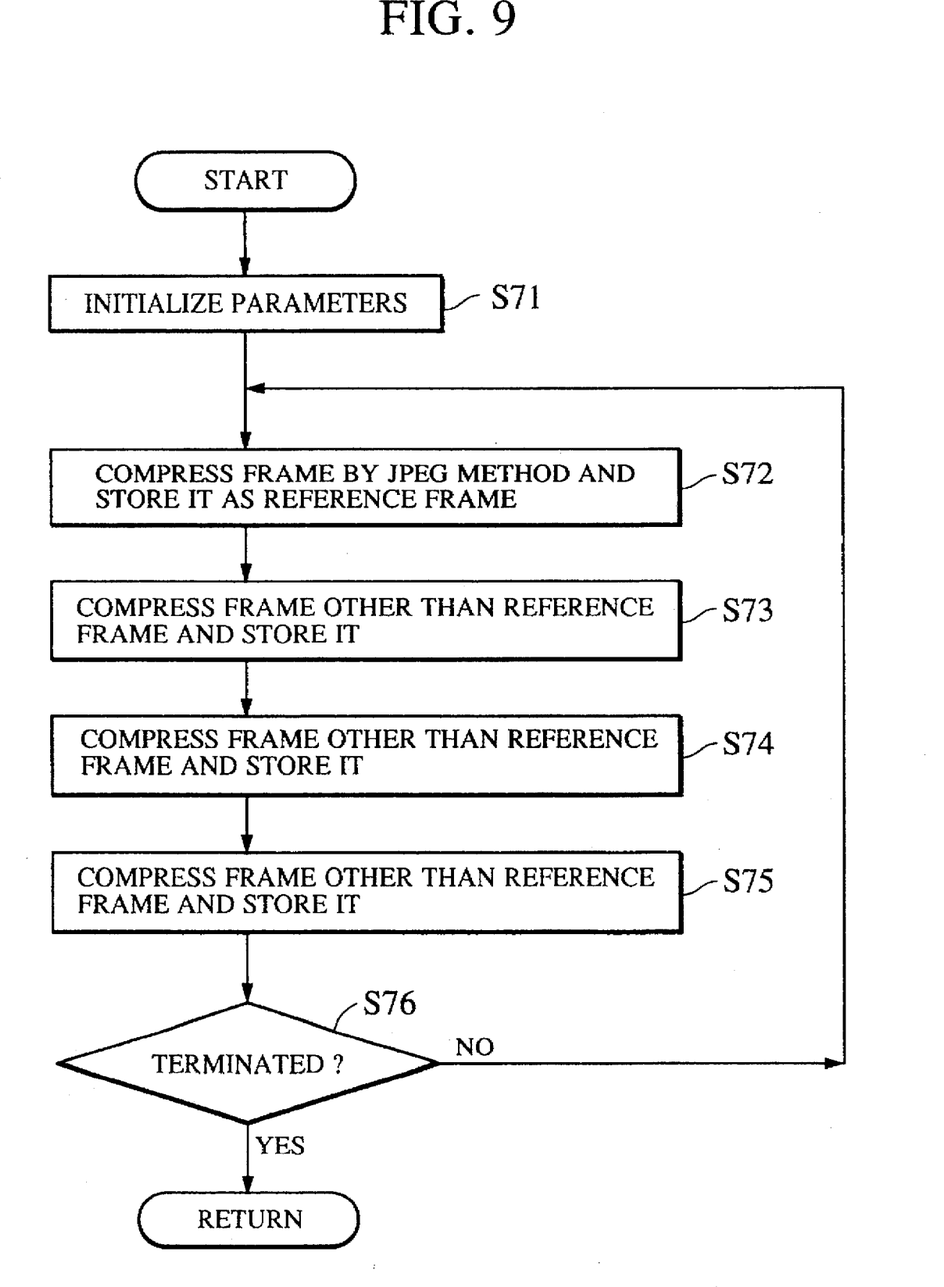
FIG. 9 is a flowchart illustrating a sequence for compressing the read image in conformity with MPEG and storing the image.

FIG. 9 is a detailed flowchart for changing a moving picture for guidance by using a read image of S35.

In step S71, the parameters are initialized. In step S72, a frame is compressed by an intraframe coding (I picture) method and stored as a reference frame. In steps S73, S74 and S75, a frame (P picture, B picture) other than the reference frame is compressed and stored. In step S76, a check is made to determine if the frame is the end frame. If the frame is the end frame, the operation for entering and holding the moving picture for guidance is terminated.

Figure 10:
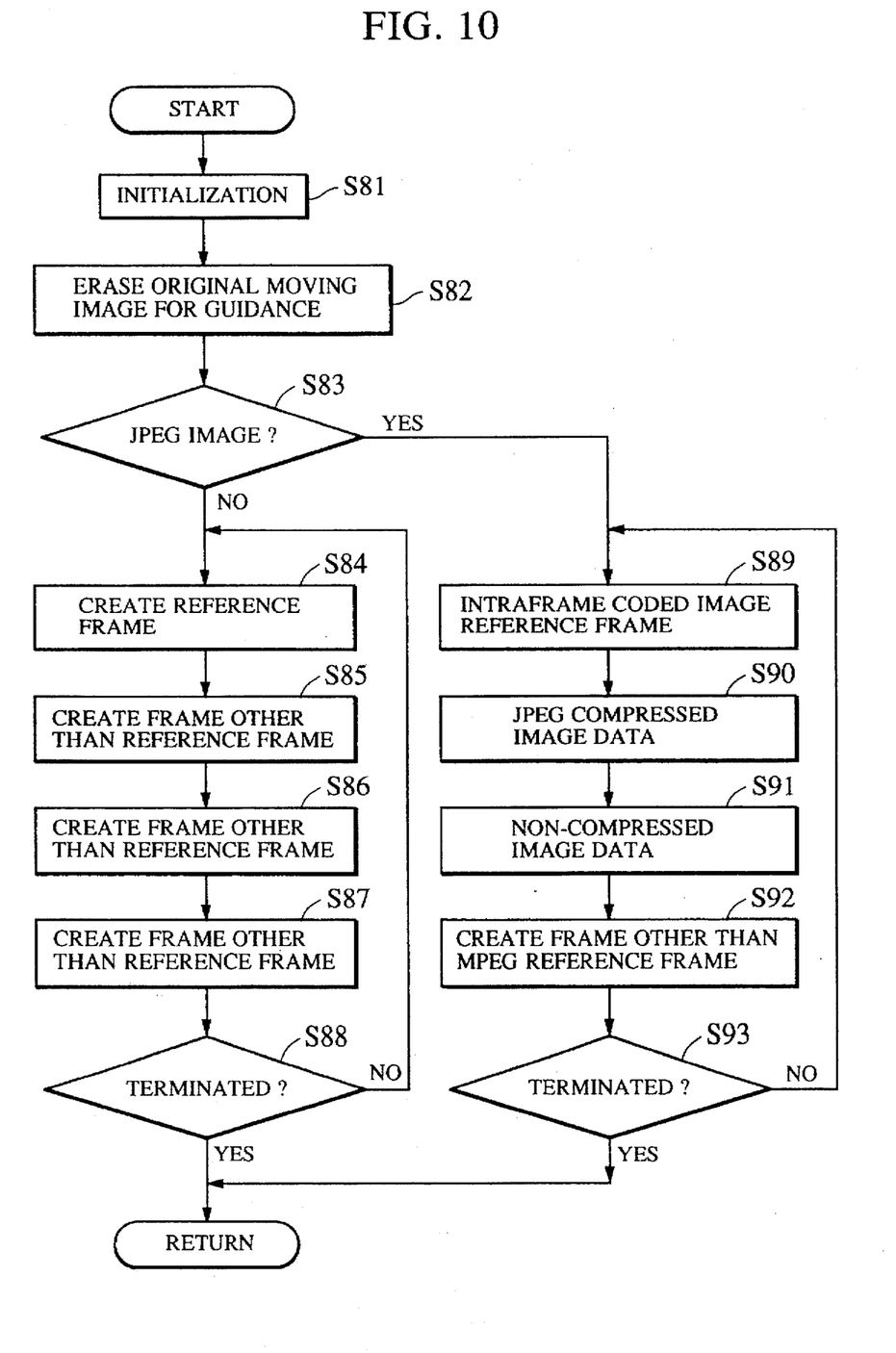
FIG. 10 is a flowchart illustrating a sequence for compressing an image received in a memory in conformity with MPEG and storing the image.

FIG. 10 is a detailed flowchart of step S45 for changing the moving picture for guidance by using an image received in the memory.

In step S81, the parameters are initialized. In step S82, the moving image for guidance to be changed is erased. In step S83, a check is made to determine if the image is an image received in the memory which is to be formed into an moving image for guidance or one compressed and received by JPEG (Joint Photographic Coding Experts Group). If JPEG is not used, the reference frame is compressed by an intraframe coding method. The frame (P picture, B picture) other than the reference frame is compressed by using MPEG in the loop: steps S84, S85, S86, S87, S88 and S84.

When the image received in the memory is an image compressed by using JPEG in step S83, as for the reference image, the image is stored as it is compressed by JPEG as in step S89. The frame other than the reference frame of steps S90, S91 and S92 is converted into JPEG compressed image data, non-compressed image data and a non-reference frame (P picture, B picture). If it is determined in step S93 that all the received images have been processed, the operation for changing the moving picture for guidance by using the image received in the memory is terminated.

In the above-described embodiment, a moving picture for guidance to be changed is selected, and an image desired by the user or a moving picture for guidance received in the memory is displayed. However, it is not always necessary to erase the stored moving picture for guidance when a new moving picture for guidance is entered, and the moving picture for guidance can be newly entered as far as the memory capacity of the RAM 4 is permitted.

In the facsimile of this embodiment, when a facsimile communication is performed by using image data using a JPEG-LSI, the circuitry is simplified by forming the JPEG compressing section of the MPEG chip for creating a moving picture for guidance so as to be shared in the compression of the image data for facsimile communication, and thus the cost of the apparatus is reduced.

According to this embodiment, as described above, since an easy-to-understand, appropriate guidance image desired by the user is prestored in storing means by input means, it is possible for the user to retrieve an easy-to-understand, appropriate guidance image from the storing means and display it on display means. Thus, the user is able to perform an appropriate operation easily and without mistakes while referring to the display, and an excellent man-machine interface can be realized.

Also, for the guidance image to be stored in the storing means, in addition to fixed ones, an easy-to-understand, appropriate guidance image desired by the user who uses the image actually may be input newly by input means or the image can be changed.

[Second Embodiment]

In the first embodiment, an example in which a moving picture for guidance is read by a document reading scanner and the picture is received in a memory is explained.

In this embodiment, moving pictures for guidance are prestored in a removable memory, such as a floppy disk or an optical disk, and the user selectively uses the memory. Thus, the moving picture for guidance can be changed.

The second embodiment will be explained with reference to the accompanying drawing.

Figure 14:
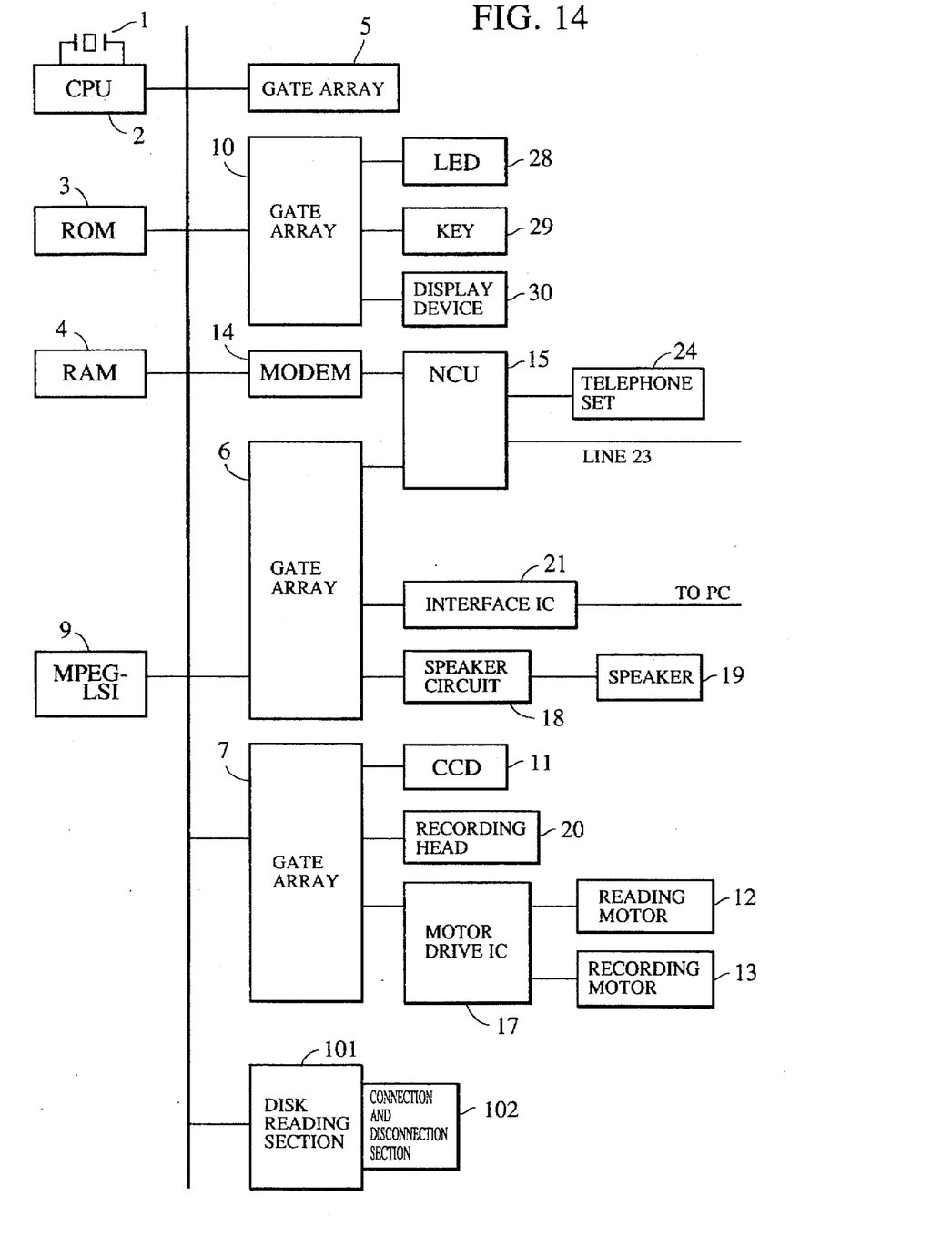
FIG. 14 is a block diagram of a facsimile in accordance with a second embodiment of the present invention.

FIG. 14 is a block diagram of a facsimile apparatus in accordance with the second embodiment of the present invention. Those components in FIG. 14 which are the same as those in FIG. 1 are given the same reference numerals, and an explanation thereof is omitted.

Reference numeral 101 denotes a reading head for reading a removable memory, such as a floppy disk or an optical disk, in which moving pictures for guidance are prestored. Reference numeral 102 denotes a housing section for housing the disk. In the removable memory, such as a floppy disk or an optical disk, functions are stored individually in each memory according to each function, for example, direct transmission, memory reception and manual transmission. The user selectively sets the memory in which a desired function is stored in the housing section 102. By pressing the start key 33 shown in FIG. 11, the moving picture guidance is displayed.

In this embodiment also, images compressed in conformity with MPEG are prestored in the memory. Since in this embodiment it is not necessary to perform reading as described above, moving pictures composed of a number of frames can be stored, and the rate is set at 24 frames/sec or more.

Since, as described above, moving-picture guidance stored in a disk is prepared for each function, and the disk is changed as required by the user, unlike the first embodiment, it is not necessary to input a plurality of images for moving pictures by scanner input or memory reception, and moving-picture guidance can be obtained easily. Also, moving-picture guidance having a high frame rate can be obtained.

Although the above-described embodiment describes a facsimile as an example, this embodiment is not limited to this example. Needless to say, this embodiment can be applied to various image processing apparatuses, such as copier machines, printers, television telephone sets, or television conference systems.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the claims. The following claims are to be accorded the broadest interpretation, so as to encompass all such modifications, equivalent structures and functions.

What is claimed is:

1. An image processing apparatus, comprising:
    first inputting means for inputting instructions to change first correlated image information composed of a plurality of frames, the first correlated image information relating to guidance for operating said image processing apparatus;
    second inputting means for inputting second correlated image information composed of a plurality of frames on the basis of the instructions input by said first inputting means; and
    display means for displaying the second correlated image information instead of the first correlated image information.

2. An image processing apparatus according to claim 1, further comprising:
    storing means for storing the second correlated image information composed of a plurality of frames; and
    compression means for compressing the second correlated image information by using a compressing method suitable for a moving picture.

3. An image processing apparatus according to claim 2, wherein said image storing means stores the second correlated image information after the second correlated image information is compressed by said compressing means.

4. An image processing apparatus according to claim 3, wherein the compressing method employed by said compressing means is MPEG.

5. An image processing apparatus according to claim 1, further comprising: control means for causing said display means to make a display.

6. An image processing apparatus according to claim 1, wherein said second inputting means comprises a document reader for reading a document.

7. An image processing apparatus according to claim 1, wherein said second inputting means inputs image information received from an external device through a communication line.

8. An image processing apparatus according to claim 1, wherein said second inputting means comprises a reading portion for reading image information from a removable memory.

9. An image processing apparatus according to claim 1, wherein the second correlated image information is displayed on said display means after the second correlated image information is input by said second inputting means.

10. An image processing apparatus according to claim 1, wherein said first inputting means is included in said display means.

11. An image processing apparatus according to claim 8, wherein said memory is an optical disk or a magnetic disk.

12. An image processing apparatus according to claim 1, wherein the frame rate at which image information is displayed by said display means is at least one frame/sec.

13. An image processing apparatus according to claim 1, wherein said image processing apparatus is a facsimile machine or a copier machine.

14. A method of guiding the operation of an image processing apparatus, said method comprising the steps of:
    inputting instructions to change first correlated image information composed of a plurality of frames, the first correlated image information relating to guidance for operating the image processing apparatus;
    inputting second correlated image information composed of a plurality of frames on the basis of the input instructions; and
    displaying the second correlated image information instead of the first correlated image information.

15. An image processing apparatus, comprising:
    first inputting means for inputting instructions to change first image information relating to guidance for operating the image processing apparatus;
    second inputting means for inputting second image information on the basis of the instructions input by said first inputting means; and
    display means for displaying the second image information instead of the first image information.

16. A method of guiding the operation of an image processing apparatus, said method comprising the steps of:
    inputting instructions to change first image information relating to guidance for operating the image processing apparatus;
    inputting second image information on the basis of the instructions input by said inputting instructions step; and
    displaying the second image information instead of the first image information.

* * * * *

UNITED STATES PATENT AND TRADEMARK OFFICE
CERTIFICATE OF CORRECTION

PATENT NO. : 5,677,772
DATED : October 14, 1997
INVENTOR(S) : TOSHIFUMI NAKAJIMA It is certified that error appears in the above-identified patent and that said Letters Patent is hereby corrected as shown below:

COLUMN 5
Line 24, delete "step" (first occurrence).

COLUMN 6
Line 2, "an" should read --a--.

Signed and Sealed this

Fourteenth Day of April, 1998

Attest:

BRUCE LEHMAN

Attesting Officer        Commissioner of Patents and Trademarks